(12) United States Patent
Kim et al.

(10) Patent No.: US 10,348,377 B2
(45) Date of Patent: Jul. 9, 2019

(54) TECHNIQUE AND APPARATUS FOR SELECTING MULTIPLE ANTENNAS

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Youngjip Kim, Hwaseong-si (KR); Seongwon Kim, Seoul (KR); Taejun Kim, Seoul (KR); Youngwook Son, Seoul (KR); Seungmin Yoo, Seoul (KR); Okhwan Lee, Seongnam-si (KR); Woonkyun Lee, Hwaseong-si (KR); Jaehong Yi, Seoul (KR); Sunghyun Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/743,987

(22) PCT Filed: Jun. 24, 2016

(86) PCT No.: PCT/KR2016/006743
§ 371 (c)(1),
(2) Date: Jan. 11, 2018

(87) PCT Pub. No.: WO2017/014437
PCT Pub. Date: Jan. 26, 2017

(65) Prior Publication Data
US 2018/0205433 A1    Jul. 19, 2018

(30) Foreign Application Priority Data

Jul. 20, 2015 (KR) .................. 10-2015-0102626

(51) Int. Cl.
*H04B 7/04* (2017.01)
*H04B 7/06* (2006.01)
(Continued)

(52) U.S. Cl.
CPC ......... *H04B 7/0608* (2013.01); *H04B 7/0691* (2013.01); *H04B 7/0874* (2013.01);
(Continued)

(58) Field of Classification Search
CPC ...... H04B 7/0608; H04B 7/0885; H04B 7/06; H04B 7/0421; H04L 5/0051
See application file for complete search history.

(56) References Cited

U.S. PATENT DOCUMENTS 5,507,035 A    4/1996  Bantz et al.
8,417,205 B2*  4/2013  Tang ............... H04B 7/0608
                                              455/272
(Continued)

FOREIGN PATENT DOCUMENTS

WO    2010134789 A2    11/2010
WO    2011042051 A1    4/2011

OTHER PUBLICATIONS

ISA/KR, International Search Report and Written Opinion of the International Search Authority, International Application No. PCT/KR2016/006743, dated Oct. 11, 2016, 9 pages.
(Continued)

*Primary Examiner* — Dac V Ha

(57) ABSTRACT

According to one embodiment of the present disclosure, a communication method of an AP using multiple antennas can be provided, comprising the steps of: setting two or more transmission descriptors including unit transmission information in which antenna combination information and transmission rate information are defined; transmitting a packet using one of the set transmission descriptors; receiv-
(Continued)

BEST: OPTIMAL COMBINATION, NEW: NEW COMBINATION ing information indicating whether the transmitted packet is a success or not; and collecting the information indicating whether the transmitted packet is a success or not for a predetermined period to reset the transmission descriptors. In addition, an apparatus using the method can be provided.

17 Claims, 11 Drawing Sheets

(51) Int. Cl.
      *H04B 7/08*     (2006.01)
      *H04L 5/00*     (2006.01)
      *H04B 7/0417*   (2017.01)

(52) U.S. Cl.
      CPC ......... *H04B 7/0885* (2013.01); *H04L 5/0051* (2013.01); *H04B 7/0421* (2013.01)

(56) References Cited

U.S. PATENT DOCUMENTS

| | | | |
|---|---|---|---|
| 2002/0006159 A1* | 1/2002 | Wagner | H04B 7/0808 375/224 |
| 2009/0022066 A1 | 1/2009 | Kish et al. | |
| 2010/0232533 A1 | 9/2010 | Lee et al. | |
| 2012/0128088 A1 | 5/2012 | Ko et al. | |
| 2015/0078488 A1* | 3/2015 | Lee | H04B 7/0691 375/316 |
| 2015/0215104 A1* | 7/2015 | Ma | H04B 7/04 455/452.1 |
| 2015/0271787 A1* | 9/2015 | Wong | H04B 7/0608 370/329 |

OTHER PUBLICATIONS

Makhlouf, Arafet Ben, "Practical Rate Adaptation for Very High Throughput WLANs," IEEE Transactions on Wireless Communications, vol. 12, Issue 2, Feb. 2013, 11 pages.

Koci, Neda, "Understanding the Role of Multi-Rate Retry Mechanism for Effective Rate Control in 802.11 Wireless LANs," 2009 IEEE 34th Conference on Local Computer Networks (LCN 2009), Zurich, Switzerland, Oct. 20-23, 2009, 6 pages.

* cited by examiner

FIG. 7B

| $A_{1b}$ | Best antenna combination index, [0, $N_{comb}$ -1] |
|---|---|
| $A_{2b}$ | Second best antenna combination index, [0, $N_{comb}$ -1] |
| $A_S$ | Sampling (New) antenna combination index, [0, $N_{comb}$ -1] |
| $N_{Attempt}$ | Number of total transmissions during 100 ms |
| NSuccess | Number of successful transmissions during 100 ms |
| RC j | (j + 1)th retry chain |
| $T_{Statistics}$ | Elpased time for statistics gathering from last renewal |
| $P_{Success}$ ($A_i$, RC j) | Success probability of $A_i$ at RC j during 100 ms |

FIG. 8

Packet Type

|        | RC 0      | RC 1      | RC 2      | RC 3      |
|--------|-----------|-----------|-----------|-----------|
| Type 1 | $A_{1b}$  | $A_{2b}$  | $A_s$     | $A_{1b}$  |
| Type 2 | $A_{2b}$  | $A_s$     | $A_{1b}$  | $A_{2b}$  |

Dfunction

|         | Condition ||| Action |
|         | Winner ||| |
|         | RC 0 | RC 1 | RC 2 | Interpretation | Action |
|---------|------|------|------|----------------|--------|
| Case 1  | $A_{1b}$ | $A_{2b}$ | Any | $A_{1b} > A_{2b} > A_s$ | Nothing |
| Case 2  | $A_{1b}$ | $A_s$ | $A_s$ | $A_s > A_{1b} > A_{2b}$ | $A_{2b} \leftarrow A_{1b}, A_{1b} \leftarrow A_s$ |
| Case 3  | $A_{1b}$ | $A_s$ | $A_{1b}$ | $A_{1b} > A_s > A_{2b}$ | $A_{2b} \leftarrow A_s$ |
| Case 4  | $A_{1b}$ | $A_s$ | ? | $A_{1b}, A_s > A_{2b}$ | $A_{2b} \leftarrow A_s$ |
| Case 5  | $A_{1b}$ | ? | Any | $A_{1b} > A_{2b}$ | Nothing |
| Case 6  | $A_{2b}$ | $A_{2b}$ | $A_s$ | $A_{2b} > A_s > A_{1b}$ | $A_{1b} \leftarrow A_{2b}, A_{2b} \leftarrow A_s$ |
| Case 7  | $A_{2b}$ | $A_{2b}$ | $A_{1b}$ | $A_{2b} > A_{1b} > A_s$ | $A_{1b} \leftrightarrow A_{2b}$ |
| Case 8  | $A_{2b}$ | $A_{2b}$ | ? | $A_{2b} > A_{1b}, A_s$ | $A_{1b} \leftrightarrow A_{2b}$ |
| Case 9  | $A_{2b}$ | $A_s$ | Any | $A_s > A_{2b} > A_{1b}$ | $A_{1b} \leftarrow A_s$ |
| Case 10 | $A_{2b}$ | ? | Any | $A_{2b} > A_{1b}$ | $A_{1b} \leftrightarrow A_{2b}$ |

| Winner | Antenna combination that has higher $P_{Success}$ than the other at a retry chain |
|--------|-----------------------------------------------------------------------------------|
| Any    | Whichever combination wins |
| ?      | No winner (due to no statistics) |

TECHNIQUE AND APPARATUS FOR SELECTING MULTIPLE ANTENNAS

CROSS-REFERENCE TO RELATED APPLICATIONS AND CLAIM OF PRIORITY

The present application claims priority under 35 U.S.C. § 365 and is a 371 National Stage of International Application No. PCT/KR2016/006743, filed Jun. 24, 2016, which claims the benefit of Korean Patent Application No. 10-2015-0102626, filed Jul. 20, 2015, the disclosures of which are fully incorporated herein by reference into the present disclosure as if fully set forth herein.

TECHNICAL FIELD

Various embodiments of the present disclosure relate to a technique and an apparatus for selecting multiple antennas, and more particularly, to a method and an apparatus for selecting an antenna combination using a plurality of retry chains.

BACKGROUND

In general, a mobile communication system has been developed for the purpose of providing communication while securing mobility of a user. Such a mobile communication system has reached a high-speed data communication service as well as a voice communication thanks to the rapid development of technique. Under this background, various techniques to improve communication speed using multiple antennas have been discussed.

Much research into the technology using multiple antennas has been conducted, and the technology is used in real life by being applied to various wireless communication systems such as the cellular communication network, the wireless local area network (WLAN) and the like. The technology using multiple antennas is largely classified into two categories. The first is to increase the transmission rate by transmitting multiple streams simultaneously using multiple antennas, and the second is to increase transmission success probability by using spatial diversity.

Gain through the spatial diversity can be obtained by using more antennas in number than streams to be transmitted. Due to the multipath fading effect of the wireless communication, the antennas experience different channels, thereby securing diversity in the channels. In this way, a gain of diversity is obtained by selectively using a good antenna for the channel. If such a diversity gain is obtained, the average channel state improves and the transmission success probability increases, which results in increase in communication efficiency.

When antennas are selectively used, the most ideal case is when channel information for each antenna is known in advance. However, when selecting a transmission antenna, only the receiving side is exactly aware of channel information. In order to overcome this problem, a number of methods of properly selecting an antenna have been devised.

One simple method is for the receiving side to measure channel information and provide feedback to the transmitting side. A method for feeding back channel information is already defined in IEEE 802.11n for MIMO communication. However, there is a limit because overhead required for channel information feedback is very large and wireless channels changes rapidly. In addition, if an antenna combination that is not used for transmission exists, channel information cannot be known.

Another method is for the transmitting side to directly measure channel information. That is, under the assumption that both channels (or uplink channel and downlink channel) are the same, channel information coming from the receiving end is used for transmission using channel reciprocity. However, since characteristics at the radio frequency (RF) chain stage change depending on the terminal, correction (calibration) is required to maintain the channel reciprocity, which also leads to large overhead.

In order to overcome the limitation of using channel information such as large overhead, there is a method of selecting an antenna in a trial-and-error manner. According to the trial-and-error selection method, when transmission failure occurs (no MAC ACK is received) in an antenna, which has been continuously using for, another antenna is selected and used. In conclusion, the antenna is selected and used depending on whether the most recent transmission or reception is a success/failure.

SUMMARY

An object of the present disclosure is directed to provision of an improved technique and apparatus for selecting multiple antennas. Another object of the present disclosure is directed to provision of a method and an apparatus for selecting an antenna combination using a plurality of chains of reties.

Various embodiments of the present disclosure are directed to the provision of a technique and an apparatus for selecting multiple antennas. According to one embodiment of the present disclosure, there is provided a communication method of an AP using multiple antennas, comprising the steps of: setting two or more transmission descriptors including unit transmission information in which antenna combination information and transmission rate information are defined; transmitting a packet using one of the set transmission descriptors; receiving information indicating whether the transmitted packet is a success or not; and collecting the information indicating whether the transmitted packet is a success or not for a predetermined period to reset the transmission descriptors. In addition, an apparatus using the method can be provided.

In addition, according to one embodiment of the present disclosure, there is provided an access point (AP) using multiple antennas, comprising: a transceiver configured to transmit and receive a signal; and a controller configured to perform control to set two or more transmission descriptors including unit transmission information in which antenna combination information and transmission rate information are defined, transmit a packet using one of the set transmission descriptors, receives information indicating whether the transmitted packet is a success or not, and collecting the information indicating whether the transmitted packet is a success or not for a predetermined period to reset the two or more transmission descriptors.

It will be appreciated by those skilled in the art that the technical objects to be achieved by the present disclosure are not limited to above-mentioned technical objects, and other technical objects not mentioned above will be clearly understood from the following detailed description.

According to one embodiment of the present disclosure, it is possible to provide an improved technique and apparatus for selecting multiple antennas. In addition, according to one embodiment of the present disclosure, it is possible to provide a method and an apparatus for selecting an antenna combination using a plurality of chains of reties.

Furthermore, according to the embodiment of the present disclosure, it is possible to provide a method and an apparatus for selecting the optimal antenna combination based on statistical information collected by the AP without checking downlink channel information.

BRIEF DESCRIPTION OF THE DRAWINGS

FIG. 8 is a diagram illustrating parameter table used in an antenna combination update according to one embodiment of the present disclosure.

DETAILED DESCRIPTION

Figure 1:
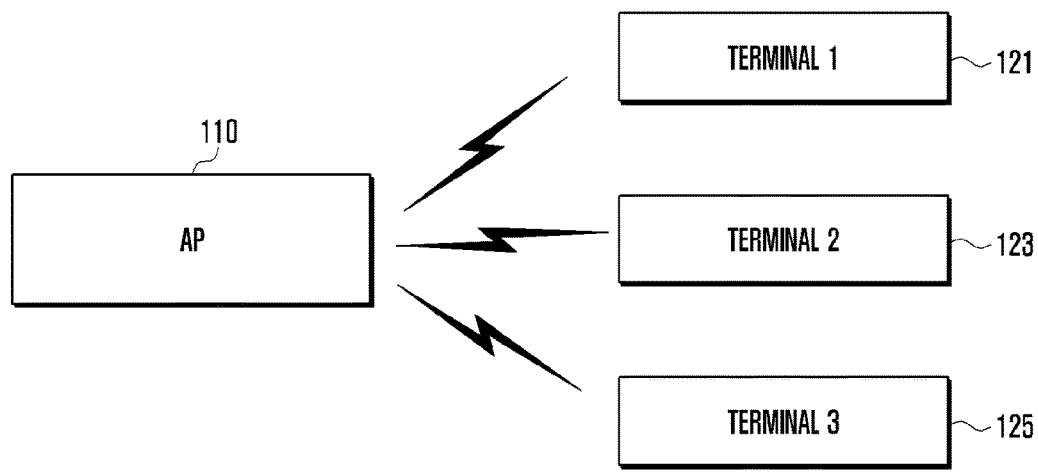
FIG. 1 is a diagram illustrating a network configuration according to one embodiment of the present disclosure.

Hereinafter, various embodiments will be described in detail with reference to accompanying drawings. In the drawings, like reference numerals refer to like elements throughout the drawings. Further, detailed description of well-known functions and configurations that may obscure the gist of the present disclosure will be omitted. In the following description, it is noted that only parts necessary for understanding operations according to various embodiments of the present disclosure, and descriptions of other parts will be omitted so as not to make the gist of the present disclosure unclear.

Hereinafter, a base station is an entity that performs resource allocation of terminals, and may be one of an eNodeB, a NodeB, a base station (BS), a wireless access unit, a base station controller, an AP, or a node on a network. A terminal may include a user equipment (UE), a mobile station (MS), a cellular phone, a smartphone, a computer, or a multimedia system capable of performing communication functions. In the present disclosure, a downlink (DL) is a wireless transmission path of a signal transmitted from the base station to the terminal, and an uplink (UL) is a wireless transmission path of a signal transmitted from a terminal to the base station. In the following, embodiments of the present disclosure will be described as an example of a wireless LAN system, but may be applied to other communication systems having a similar technical background or channel form. In addition, embodiments of the present disclosure may be applied to other communication systems through some modifications within the range without largely departing from the scope of the present disclosure by the judgment of those skilled in the art.

The embodiments of the present disclosure describe a method and an apparatus for utilizing spatial diversity in the AP. In the embodiments of the present disclosure, an antenna combination for transmission and reception is selected and used in the multi-antenna AP without feedback on channel information. Through the selected combination, diversity gain can be obtained, which results in an increase in communication efficiency.

In order to use the technique of selecting the antenna using the channel information, it is necessary to know information on the channel from the transmitting side and the receiving side. There are two ways to get this information. The first way is to measure the channel at the receiving side and feedback to the transmitting side, and the second way is to directly evaluate the channel using the channel reciprocity at the transmitting side. The first way requires periodic feedback in response to channel changes, and the second way also requires one feedback for correction. In an Orthogonal Frequency Division Multiplexing (OFDM) communication, which is mainly used in a wireless communication system, a large overhead occurs because a channel is different for each sub-carrier, and the overhead increases in proportion to the number of antennas. Therefore, in a case of not using the channel information, overhead is capable of being reduced and the system is capable of being operated more efficiently.

One trial-and-error scheme uses a specific antenna combination without using the channel state information, and when performance of the specific antenna combination deteriorates, changes the combination to another antenna combination. That is, it selects the antenna only by the transmission failure of the recent transmission. The disadvantage of selecting the antenna in this way is that the best antenna combination cannot be used. For example, the antenna combination that is currently used is the most optimal, but if packet transmission fails, the worse antenna is selected and used.

Another trial-and-error scheme tries probing for all antenna combinations and finds the best antenna combination. However, in a case where probing is performed on all antenna combinations one by one for a predetermined time period, all antenna combinations are compared, and then the antenna combination is selected, it takes a relatively long time and a overhead is large. In addition, if the channel is changed during probing, the selected antenna combination may not be optimal. Therefore, it is difficult to perform an appropriate operation in a wireless channel environment changing at a high speed.

In the embodiments of the present disclosure, a method and an apparatus for selecting an optimal antenna combination based on statistical information collected by an AP in a situation where downlink channel information is not known accurately are proposed. In the related art, the antenna combination is selected by using the channel information fed back from the terminal or the channel information measured in the AP, but in the actual system, the use effect is limited due to the large overhead and a limitation of the channel information measured in the AP. In the embodiments of the present disclosure, the system for selecting the antenna combination based on statistical information on the transmission success rate without the channel information can perform adaptive operations adapted in a rapidly changing wireless channel environment by using two combinations having the highest transmission success rates, and can effectively improve the network performance by performing sampling only during retransmission to reduce performance deterioration by sampling. This leads to effective operation of wireless resource in an office situation where many terminals are simultaneously connected to an AP and is expected to improve service quality experienced by a large number of users.

FIG. 1 is a diagram illustrating a network configuration according to one embodiment of the present disclosure.

Referring to FIG. 1, the network may include an AP 110 and terminals 121, 123 and 125. The AP may be a base station. The AP 110 may include multiple antennas, and may communicate with at least one of the terminals 121, 123 and 125 using the multiple antennas.

The AP 110 may transmit a downlink signal (packet) to the terminals 121, 123 and 125. The terminals 121, 123 and 125 may transmit indication information indicating whether to receive the downlink signal to the AP 110. The indication information may be referred to as ACK information or MAC information. In the LTE system, the indication information may be a hybrid automatic repeat request (HARQ). The LTE system employs the HARQ scheme in which, when a decoding failure occurs in the initial transmission, the corresponding data is retransmitted in the physical layer. In the HARQ scheme, if the receiver fails to correctly decode data, the receiver transmits information indicating decoding failure (Negative ACKnowledgement, NACK) to the transmitter so as to cause the transmitter to retransmit the corresponding data in the physical data.

The AP 110 may collect statistical information by combining packet information transmitted to each terminal with indication information received from each terminal. The statistic information may be a combination of the number of transmitted packets with the number of successfully transmitted packets. The AP 110 may interpret the transmitted packet as a successful packet if MAC ACK for the transmitted packet is received. The AP 110 may select an antenna combination based on the statistical information. The AP 110 performs communication with the terminals 121, 123 and 125 using the newly set antenna combination. The AP 110 repeats the process of transmitting the downlink signal to the terminal 121, 123 and 125 and selecting a new antenna combination based on the statistic information collected corresponding to the downlink signal.

Figure 2:
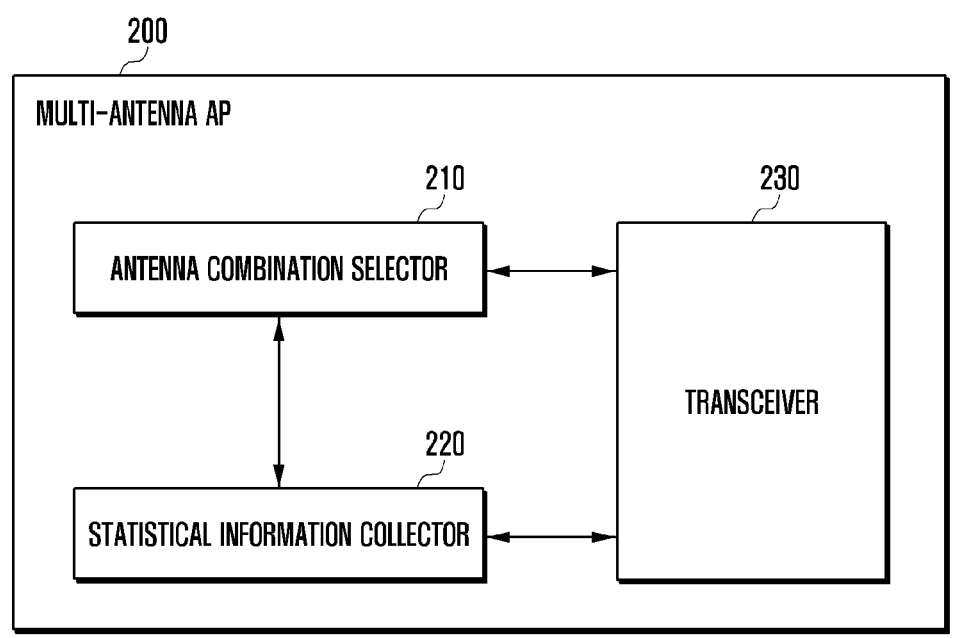
FIG. 2 is a diagram illustrating a multi antenna access point (AP) according to one embodiment of the present disclosure.

FIG. 2 is a diagram illustrating the AP (multi-antenna AP) according to one embodiment of the present disclosure.

Referring to FIG. 2, the multi-antenna AP 200 may include an antenna combination selector 210, a statistical information collector t210, and a transceiver 230. The statistical information collector 220 collects statistical information on antenna combinations based on packet information transmitted from the transceiver 230 and received MAC ACK information. The statistical information may be expressed by a ratio of the number of the transmitted packet to the number of packets that have been successfully transmitted. For example, the statistical information includes the total number of packets that have been transmitted and the number of packets that has been successfully transmitted. The statistical information may be set for each terminal. That is, the number of packets that have been transmitted and the number of packets that has been successfully transmitted, which correspond to the number of packets that have been transmitted, for each terminal during a predetermined period may be managed as statistical information.

The antenna combination selector 210 may select an antenna combination for which an optimal operation is expected based on the statistical information collected by the statistic information collector 220. The antenna combination may be represented by selection of antennas for each antenna port. For example, in a case in which 3 antenna ports is able to selectively use 2 antennas, the number of antennas to be selected for each antenna port is two. Therefore, when all antenna ports are used, a total of eight antenna combinations can be selected. The antenna combination selector 210 may select the antenna combination for which the optimal operation is expected among all antenna combinations. The antenna combination selector 210 may set an antenna combination for the general transmission (unicast) and a default antenna combination for transmission and reception (multicast) separately from each other.

The transceiver 230 sets the antenna combination selected by the antenna combination selector 210 and communicates with terminals. For example, in a wireless LAN system, the antenna combination for unicast transmission is separately selected for each terminal, and the default antenna combination for multicast transmission and reception (unlink) is equally applied to all terminals according to the characteristics of the system.

In the meantime, the configuration of the multi-antenna AP 200 according to the present disclosure is not limited to that of FIG. 2. For example, the multi-antenna AP 200 may include a controller and a transceiver. Here, the controller may perform functions of the antenna combination selector and the statistic information collector.

According to the embodiment of the present disclosure, the controller may perform control to set two or more transmission descriptors including unit transmission information in which the antenna combination information and transmission rate information are defined, transmit a packet using one of one of the set transmission descriptors, receive information indicating whether the transmitted packet is a success or not, and collect the information indicating whether the transmitted packet is a success or not for a predetermined period to reset the two or more transmission descriptors. The antenna combination information may indicate a mapping relationship between a plurality of antenna ports and an antenna corresponding to each of the antenna ports among the multiple antennas. In addition, the controller may perform control to determine antenna combination information to be used in the resetting based on the information indicating whether the transmitted packet is a success or not.

Furthermore, the transmission descriptor may include a first transmission descriptor and a second transmission descriptor. The first transmission descriptor may include first unit information in which first transmission rate and first antenna combination are defined, second unit information in which second transmission rate and second antenna combination are defined, and third unit information in which third transmission rate and third unit information are defined, and the second transmission descriptor may include fourth unit information in which the first transmission rate and the second antenna combination are defined, fifth unit information in which the second transmission rate and the third antenna combination are defined, and sixth unit information in which the third transmission rate and the first unit information are defined. In the setting of each of the first and second transmission descriptors, the antenna combinations may be arranged in the order of the first antenna combination, the second antenna combination, and the third antenna combination in performance.

The controller may perform control to transmit a packet by alternately applying the first transmission descriptor and the second transmission descriptor.

The controller may perform control to evaluate performance of each of the antenna combinations based on information indicating whether a packet transmitted using the antenna combination of each unit information in which the same transmission rate is set is successfully received. In addition, the controller may perform control to determine antenna combination information to be used in the resetting of the transmission descriptors based on performance evaluation of each of the antenna combinations.

The controller may perform control to, based on performance evaluation of each of the antenna combinations, determine antenna combinations that are evaluated as top two and a new antenna combination other than the first, second and third antenna combinations to be the antenna combination to be used in the resetting.

The controller may perform control to set the antenna combination that has successfully transmitted the largest number of packets for the transmission rate to be a multicast transmission basic antenna combination.

Also, the controller, the antenna combination selector, and the statistic information collector may perform control to perform operations of the multi-antenna AP described below as well as operations of the multi-antenna AP 200 described in FIG. 2.

Figure 3:
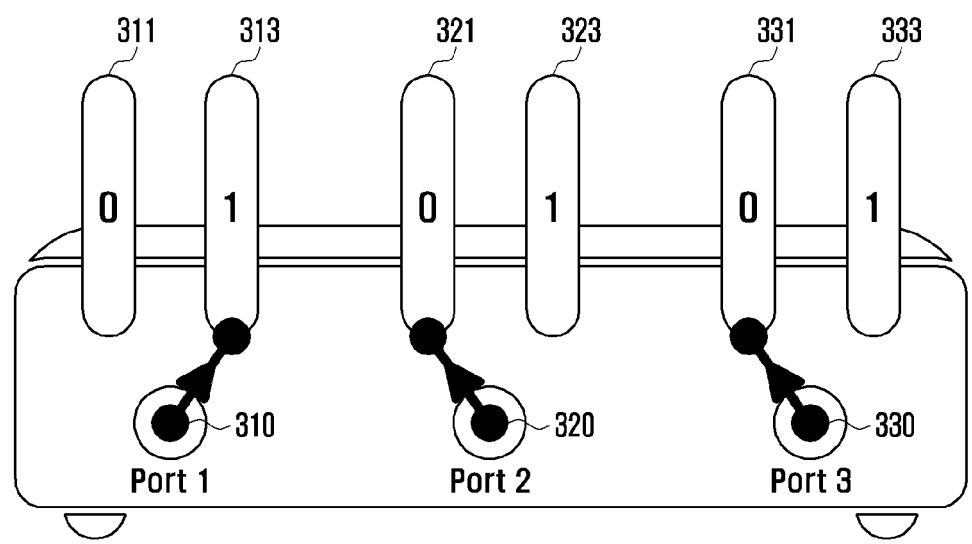
FIG. 3 a diagram illustrating an antenna combination according to one embodiment.

FIG. 3 a diagram illustrating an antenna combination according to one embodiment.

In a multi-antenna AP, many antennas may be connected to one antenna port. An antenna combination may represent antennas selected at each antenna port. 'antenna port' and 'RF port' can be used with the same meaning. The multi-antenna AP may use all of the antenna ports among a plurality of antenna ports, or may use only some of the antenna ports required among all antenna ports. In each case, an antenna combination selector may select which antenna port to use among antenna ports. In the embodiment in FIG. 3, a case where all antenna ports are used will be described by way of example.

Referring to FIG. 3, the multi-antenna AP may include antenna port 1 310, antenna port 2 320, and antenna port 3 330. Each antenna port may selectively use two antennas. The antenna port 1 310 may be connected to antenna 0 311 and antenna 1, the antenna port 2 320 may be connected to antenna 0 321 and antenna 1 323, and the antenna port 3 330 may be connected to antenna 0 331 and antenna 1 333.

In the embodiment according to the present disclosure, the antenna combination can be represented by a bitmap. For example, the bitmap may be used to indicate the antenna combination, where the antenna port 1 310 is used as a first bit, the antenna port 2 is used as a second bit, and the antenna port 3 is used as a third bit.

If all antenna ports are used, eight antenna combinations are possible as shown in Table 1.

TABLE 1

| antenna combination | antenna port 1 | | antenna port 2 | | antenna port 3 | |
|---|---|---|---|---|---|---|
| | No. 0 | No. 1 | No. 0 | No. 1 | No. 0 | No. 1 |
| 000 | o | | o | | o | |
| 001 | o | | o | | | o |
| 010 | o | | | o | o | |
| 011 | o | | | o | | o |
| 100 | | o | o | | o | |
| 101 | | o | o | | | o |
| 110 | | o | | o | o | |
| 111 | | o | | o | | o |

In the embodiment of FIG. 3, the antenna combination is 100, which indicates that the antenna port 1 310 uses the antenna 1, the antenna port 2 320 uses the antenna 0, and the antenna port 330 uses the antenna 0. In the embodiment according to the present disclosure, the multi-antenna AP may dynamically change the combination of antenna ports based on statistical information of the number of packets that have been transmitted and the number of packets that have been successfully transmitted.

Figure 4:
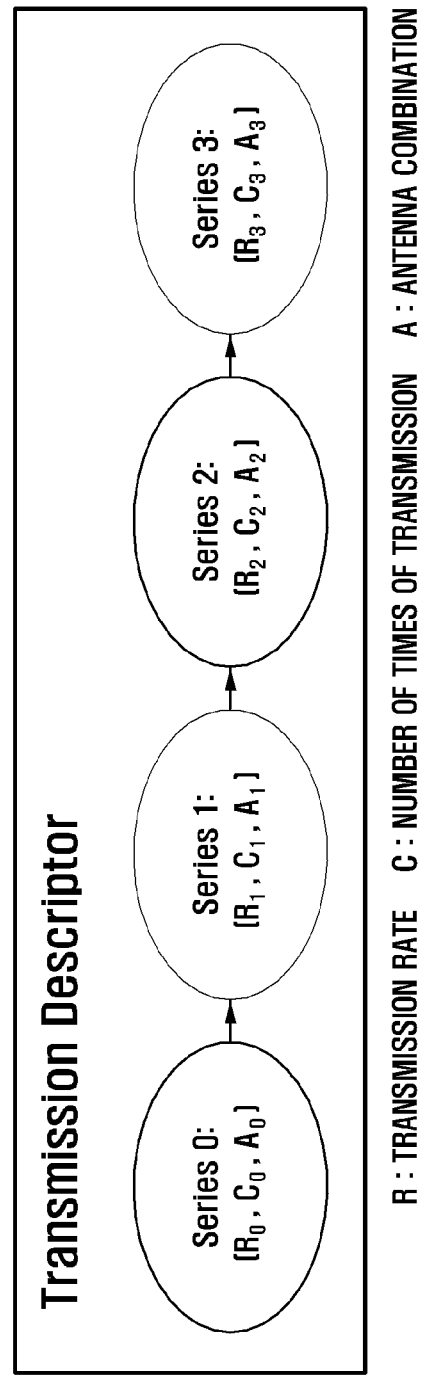
FIG. 4 is a diagram illustrating a transmission descriptor according to one embodiment of the present disclosure.

FIG. 4 is a diagram illustrating a transmission descriptor according to one embodiment of the present disclosure.

Referring to FIG. 4, the transmission descriptor may include at least one series. The transmission descriptor may be used in combination with a transmission chain, a transmission scheme, and the like. The series may be referred as unit transmission information, a retry series, and a retry chain. The transmission descriptor may include at least one piece of unit transmission information. In the embodiment of FIG. 4, one transmission descriptor includes 4 pieces of unit transmission information, for example.

An antenna combination selector or a controller may use the transmission descriptor when setting an antenna combination for packet transmission. The transmission may be set for each transmission packet. A case where the transmission descriptor is applied for each transmission packet will be described below by way of example.

In one piece of unit transmission information, transmission rate R, the number of times of transmission C, and the antenna combination A may be set. This is information for describing the transmission rate R, the number of times of transmission C, and the antenna combination A used in each piece of unit transmission information. For each piece of unit transmission rate, the transmission rate, the number of times of transmission, and the antenna combination may be set. For example, for unit information n, the transmission rate $R_n$, the number of times of transmission $C_n$, and the antenna combination $A_n$ may be set.

Each retry series may be applied to retransmission for the corresponding packet transmission. For example, for retry series 0 in FIG. 4, the AP transmits the corresponding packet at the transmission rate $R_0$ by the antenna combination $A_0$. The AP may retransmit the corresponding packet by the number of times of transmission $C_0$. If the corresponding packet is successfully transmitted within the set number of times of transmission $C_0$, the transmission of the packet ends, instead of proceeding to the next series.

If the packet transmission continues to fail, the process proceeds to retry series 1. The AP transmits the packet using the transmission rate $R_1$, the antenna combination $A_1$ and the number of times of transmission $C_1$ set in the retry series 1. The AP may retransmit the packet by the number of times of transmission $C_1$. If the packet is successfully transmitted within the set number of times of transmission $C_1$, the transmission of the packet ends instead of proceeding to the next series. If the transmission of the packet continues to fail, the packet may be transmitted in the retry series 2 and the retry series 3. If all retry series fails to transmit the packet, the AP may drop the transmission of the packet.

The AP may collect statistic information on packets transmitted by each antenna combination. The AP may select which antenna combination is the optimal antenna to service the corresponding terminal based on the statistical information. The AP may use the transmission descriptor to which a new antenna combination is applied based on the statistical information. The antenna combination selector may store information on a plurality of transmission descriptors, and may select the antenna combination that is expected to have an optimal efficiency is expected based on the statistical information.

Figure 5:
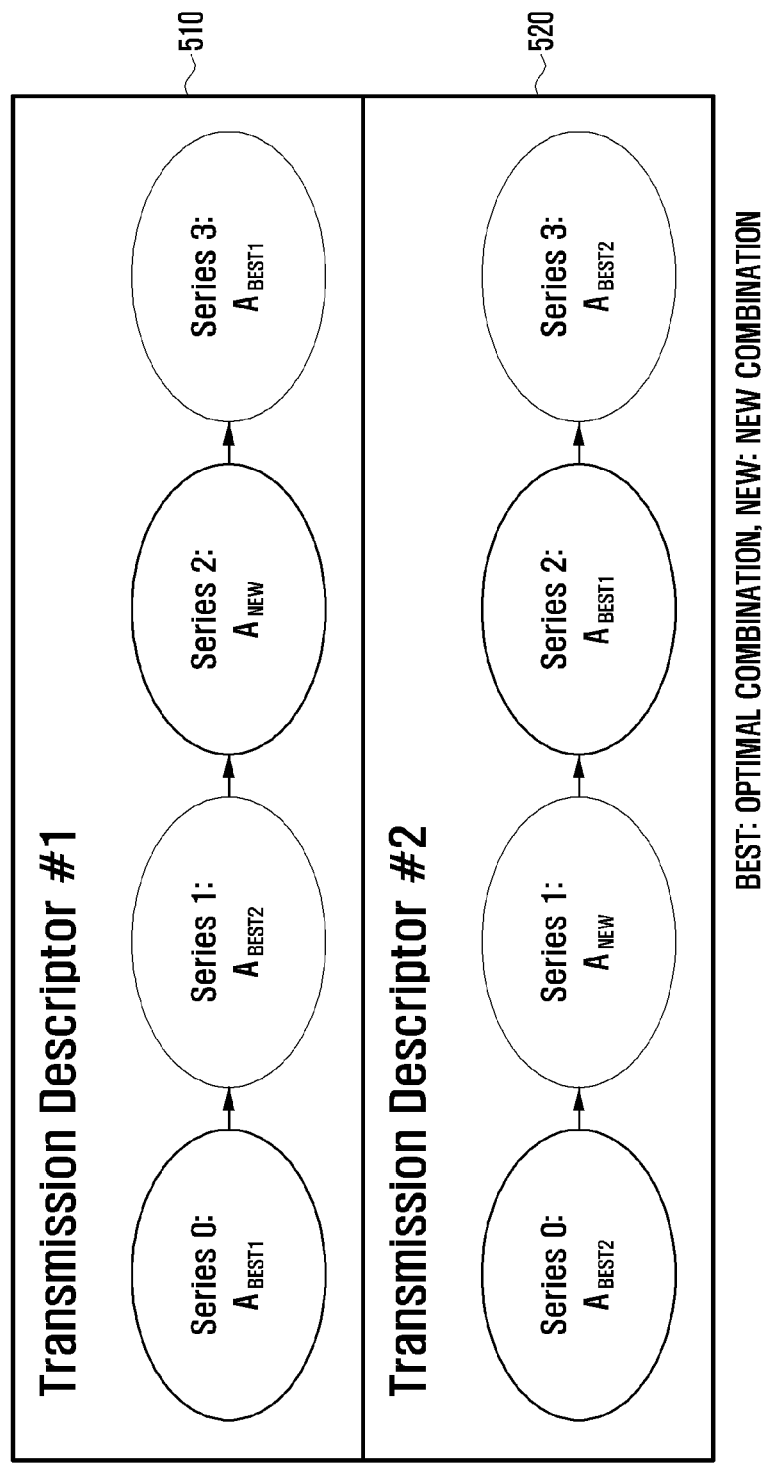
FIG. 5 is a diagram illustrating a retry chain of a transmission descriptor according to one embodiment of the present disclosure.

FIG. 5 is a diagram illustrating a retry series of a transmission descriptor according to one embodiment of the present disclosure.

FIG. 5 is a diagram illustrating a case of two transmission descriptors. The configuration and operation method of each transport descriptor are the same as those described in FIG. 4. That is, each descriptor includes a retry series, and each retry series n includes a transmission rate $R_n$, the number of times of transmission $C_n$, and an antenna combination $A_n$. An AP may transmit a packet by applying the retry series in the order of retry series 0→retry series→1 retry series 2→retry series 3. Reference is made to FIG. 4 for a specific operation.

In FIG. 5, one transmission descriptor may use at least three antenna combinations. An AP may know information on the optimal antenna combination for servicing the terminal at a specific time. This may be based on statistic information, or may be based on channel state information. For example, it is assumed that the antenna combination 1 has the best performance, and the antenna combination 2 has the second best performance. It is also assumed that an antenna combination other than the antenna combination 1 and the antenna combination 2 may be selected as an auxiliary antenna combination (which can be named as arbitrary antenna combination or new antenna combination). The new antenna combination is for additional sampling or probing, and may be selected from antenna combinations other than the antenna combination 1 and the antenna combination 2 regardless of the current antenna performance.

FIG. 5 includes a first transmission descriptor 510 and a second transmission descriptor 520. Series 0 of the first transmission descriptor may use the antenna combination 1, series 1 may use the antenna combination 2, and series 3 may use a new antenna combination. Series 3 of the first transmission descriptor 510 may use the antenna combination 1. Series 0 of the second transmission descriptor 520 may use the antenna combination 2, series 1 may use a new antenna combination, and series 2 may use the antenna combination 1. Series 3 of the second transmission descriptor 520 may use the antenna combination 2. Each descriptor may transmit n packets alternately.

In the embodiment of the present disclosure, the first transmission descriptor 510 may use the best antenna combination 1 in the retry series 0, the best antenna combination 2 in the retry series 1, and a new antenna combination in the retry series 2. The second transmission descriptor 520 may use the best antenna combination 2 in the retry series 0, a new antenna combination in the retry series 1, and the antenna combination 1 in the retry series 2. At the point of time of setting the transmission descriptor, it is assumed that, in antenna combination performance, the antenna combination 1>the antenna combination 2>the new antenna combination.

In the embodiment of the present disclosure, the first transmission descriptor 510 and the second transmission descriptor 520 use different antenna combinations in the same series. In this case, it is assumed that transmission rates $R_n$ are the same in the same series. This allows the performances of different antenna combinations to be compared with each other at the same transmission rate. In the retry series, each retry series uses different transmission rates. For example, as the series proceeds from 0 to 3, that is, in the order of 0, 1, 2 and 3, the lower transmission rate can be used. Therefore, statistical data obtained from retry series with different phases are not able to be compared to each other since transmission rates are different.

For example, in a case where the transmission rate $R_O$ is used in the series 0 and the transmission rate $R_1$ is used in the series 1, when the transmission line $R_0$ is used, it may be meaningless that collected statistical data and the statistical data of the transmission rate $R_1$ are compared to each other. Performance of Best obtained by using a certain transmission rate in the retry series 0 and performance of $2^{nd}$ Best obtained by using other transmission rate in the retry series 1 are not able to be compared to each other. That is, since performances are compared only for each chain, performances of the Best and the $2^{nd}$ Best combinations are compared in the retry series 0, performances of the $2^{nd}$ Best and a new combinations are compared in the retry series 1, and performances of the Best and a new combinations are compared in the retry series 2, thereby making it possible to find the top two combinations again. Furthermore, performance degradation due to sampling may be minimized by using a new antenna combination only in the retry chains 1 and 2, that is, only when retransmission is performed.

In the present disclosure, as described above, the same transmission rate may be used for each retry series, and the same series of the different transmission series may be set to use different antenna combinations to compare performances of antenna combinations at the same rate. Accordingly, statistical information collected about the packet that has been transmitted in the above-mentioned environment may be used as useful information.

Although FIG. 5 illustrates the use of two transmission descriptors, n transmission descriptors may be also used in a similar manner.

Figure 6:
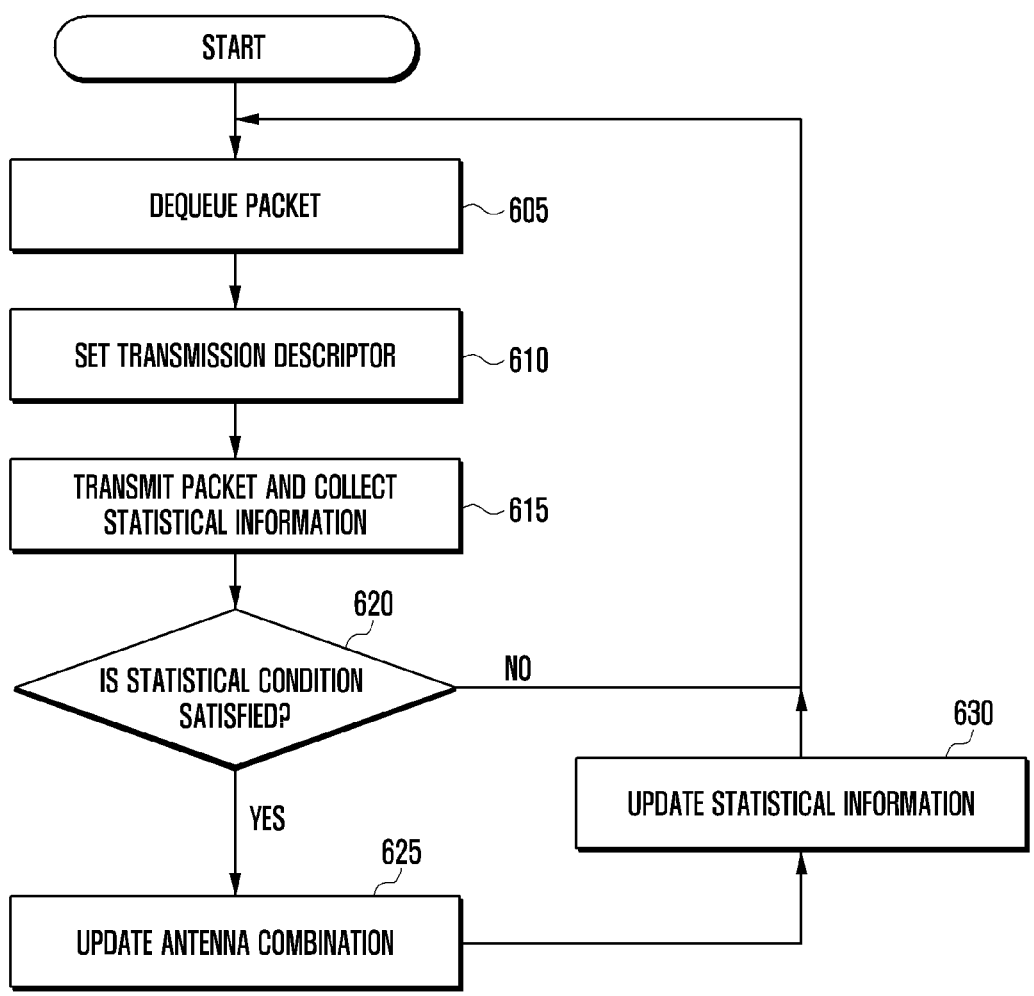
FIG. 6 is a diagram illustrating a method of selecting a transmission antenna combination which is used by an antenna combination selector according to one embodiment of the present disclosure.
Figure 7A:
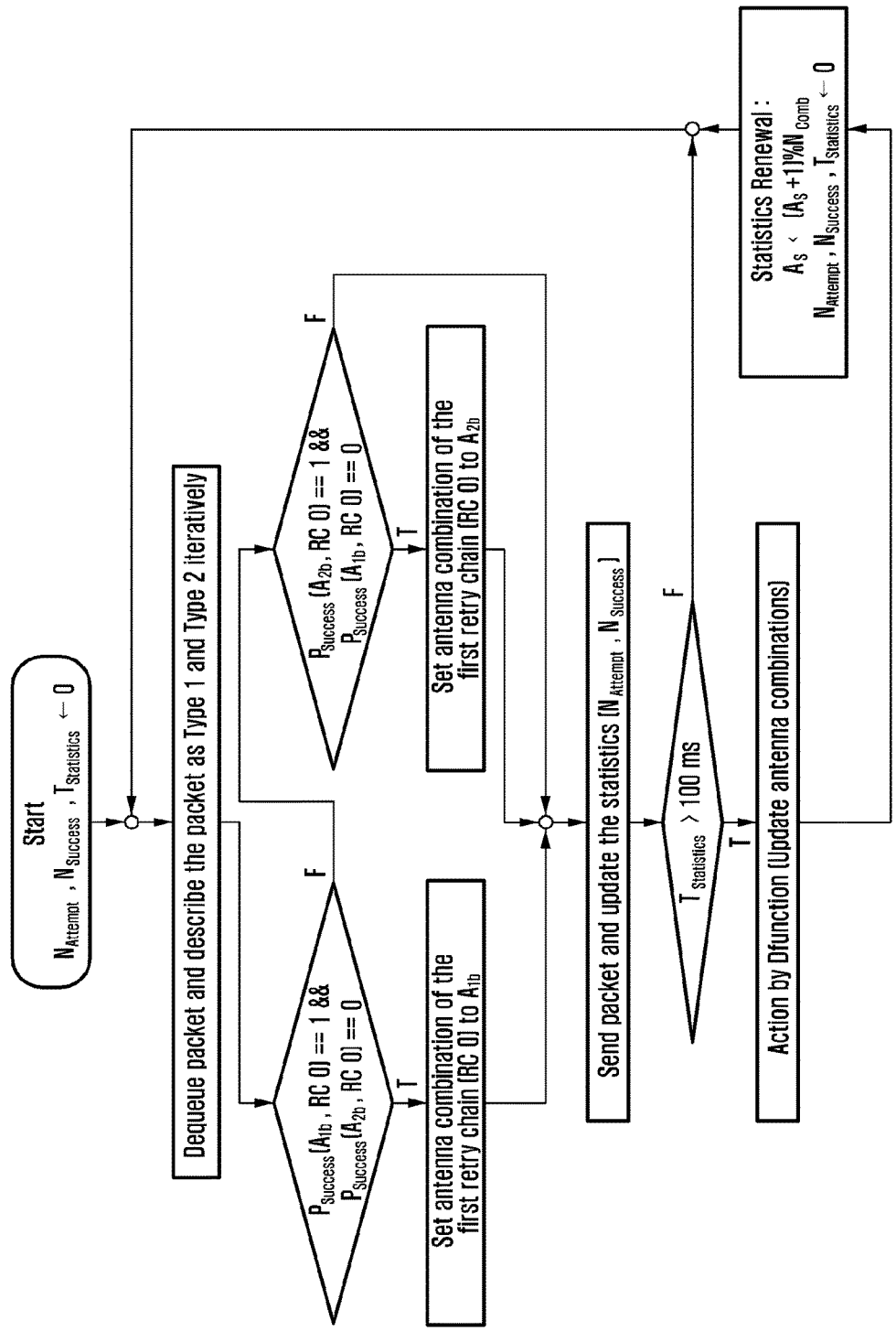
FIG. 7 is a diagram illustrating a method of selecting a transmission antenna combination which is used by an antenna combination selector according to a further embodiment of the present disclosure.

FIG. 6 is a diagram illustrating a method of selecting a transmission antenna combination according to one embodiment of the present disclosure, and FIG. 7 is a diagram illustrating a method of selecting a transmission antenna combination according to a further embodiment of the present disclosure.

Referring to FIG. 6, in Act 605, an AP dequeues a packet to be transmitted. A first-type packet is a packet transmitted in a first transmission descriptor, and a second-type packet is a packet transmitted in a second transmission descriptor.

In Act 610, the AP may set transmission descriptors for packet transmission. The AP may set at least two transmission descriptor. The AP may transmit packets based on the settings of the transmission descriptor (antenna combination, transmission rate, number of times of transmission). In the embodiment in FIG. 6, it is assumed that two transmission descriptors (first transmission descriptor and second transmission descriptor) are used. In FIG. 6, it is assumed that two transmission descriptors described in FIG. 5 are used. The order of Act 605 and Act 610 is interchangeable.

In Act 615, the AP transmits the packet using the set transmission descriptors and collects statistical information. The AP may transmit the packet using the first transmission descriptor and the second transmission descriptor. The AP sets the first transmission descriptor and the second transmission descriptor alternately to transmit the packet. The AP may transmit the packet using the method described in FIG. 4 and FIG. 5.

The AP may receive information indicating whether the transmitted packet is a success or not. The AP may update statistical information based on the information indicating whether the transmitted packet is a success or not. The statistical information may be information indicating the number of packets that have been successfully transmitted for all transmitted packets. In addition, the statistical information may be information on a combination of each antenna combination, the number of transmitted packets and the number of packets that have been successfully transmitted.

In Act 620, the AP determines whether a statistical condition for updating the antenna combination is satisfied. The statistical condition may be determined using a preset threshold value. For example, when the time during which the statistical information is collected exceeds a predetermined time or when the number of transmitted packets exceeds the preset threshold value, it may be determined that the statistical condition is satisfied. For example, when the threshold value of time is set to 100 ms, it may be determined that the statistical condition is satisfied when the time during which the statistical information is collected exceeds 100 ms. When the statistical condition is satisfied, the method proceeds to Act 625, and when the statistical condition is not satisfied, the method proceeds to Act 605.

In Act 625, the AP may update the antenna combination. The AP may set the antenna combination for each transmission descriptor. Depending on the statistical information, the antenna combination may not be changed. The AP may select the antenna combination using the Dfunction in FIG. 7. The AP may set the optimal antenna combination, the second optimal antenna combination, and a new antenna combination. That is, the AP may select the top two antenna combinations or the new antenna combination based on the statistical information. Here, the new antenna combination is to be an antenna combination different from the antenna descriptor which was set to be a new antenna combination in the immediately previous descriptor. This allows sampling to be performed for any other antenna combination other than the optimal antenna combination.

In Act 630, the AP updates the statistical information. The AP may update the statistical information such as the number of transmitted packets, the number of packets that have been successfully transmitted, the time during which the statistical information is collected. For example, the above-mentioned information may be reset to 0. The process of collecting the statistical information until the preset threshold condition is satisfied, and selecting the optimal antenna combination based on the collected statistical information may be repeatedly used.

In addition, the AP may change the antenna combination before the update condition is satisfied. The statistical information is collected until the update condition is satisfied. In a case where the statistical information collected in the current statistical information collecting interval indicates that all transmissions in the first retry series of the first transmission descriptor are successful and all transmissions in the first retry series of the second transmission descriptor are failed, the update condition is not satisfied, but it is possible to identify that the antenna combination of the first retry series of the second transmission descriptor is not appropriate. Therefore, in this case, the antenna combination of the first retry series of the second transmission descriptor may be changed to the antenna combination of the first retry series of the first transmission descriptor.

Likewise, in a case where all transmissions in the first retry series of the second transmission descriptor are successful, and all transmissions in the first retry series of the first transmission descriptor are failed, even before the update condition is satisfied, it is possible to identify that the antenna combination of the first retry series of the first transmission descriptor is not appropriate. Therefore, in this case, the antenna combination of the first retry series of the first transmission descriptor may be changed to the antenna combination of the first retry series of the second transmission descriptor. This process is described in FIG. 7.

In addition, a threshold value for changing the antenna combination before the statistical condition of 620 is satisfied may be set. For example, when the first antenna combination set in the same series during the statistical interval has a rate of packet transmission success equal to or greater than a preset threshold value (for example, 97%) and the second antenna combination set in the same series has a rate of packet transmission success equal to or less than to a preset threshold value (for example, 3%), the second antenna combination may be changed to the first antenna combination.

FIG. 8 is a diagram illustrating a parameter table used in an antenna combination update according to one embodiment of the present disclosure.

An antenna combination selector or a controller may update the antenna combination using the parameter table.

Referring to FIG. 8, type 1 is a transmitting packet in a first transmission description, and type 2 is a transmitting packet in a second transmission description. RC indicates a retry chain. $RC_n$ indicates an n-th series or n-th retry series. The type 1 packet is a transmitted packet in the first descriptor and the type 2 packet is a transmitted packet in the second descriptor.

The parameter table is used to update the antenna combination to be used next based on statistical information derived from comparison of packets transmitted according to the packet type. An AP identifies one antenna combination having a high probability that a packet is successfully transmitted as "Winner" based on the statistical information in each retry series. The AP may identify the antenna having a high probability that a packet is successfully transmitted in each retry series, and may determine superiority or inferiority among the three antenna combinations based on the antenna information having a high probability that a packet is successfully transmitted in each retry series. That is, superiority or inferiority among the three antenna combinations may be determined based on the statistic information.

For example, the combinations selected in retry chain 0 may include Best($A_{1b}$) or $2^{nd}$ Best($A_{2b}$) according to the packet type, and the packet having a high probability of success between the two combinations becomes "Winner". Case 1 shows that A1b ($A_{1b}$>$A_{2b}$) in retry chain 0 and $A_{2b}$ ($A_{2b}$>$A_s$) in retry chain 1 are identified, so that antenna combination performance has a relation of $A_{1b}$>$A_{2b}$>$A_s$. In FIG. 8, "interpretation" is a field indicating antenna combination performance based on the probability of success for each antenna combination in each retry chain. In Case 1, the antenna combinations $A_{1b}$ and $A_{2b}$ are unchanged. However, the existing $A_s$ is changed to a new antenna combination $A_{s'}$. The top two combinations of the existing antenna performance are equally used in the next cycle of packet transmission, and $A_s$ is changed and used as a new antenna combination. The new antenna combination is different from $A_{1b}$, $A_{2b}$, and is also a different antenna combination from the previously used $A_s$.

For example, Case 2 shows that $A_{1b}$ ($A_{1b}$>$A_{2b}$) in retry chain 0 and $A_s$ ($A_s$>$A_{1b}$) in retry chain 1 are identified, antenna combination performance has a relation of $A_s$>$A_{1b}$>$A_{2b}$.

As a result of statistical collection, the performance of the $A_s$ antenna combination is the best. Therefore, the current antenna combination $A_s$ is the best antenna combination, and the antenna combination $A_{1b}$ is the $2^{nd}$ best antenna combination. In this way, the current $A_{1b}$ antenna combination is set to the position of $A_{2b}$ in the packet type of FIG. 8, and the current $A_s$ antenna combination is set to the position of $A_{1b}$ in the packet type of FIG. 8. The $A_s$ of packet type is changed to a new antenna combination. The new antenna combination may be one of the antenna combinations except the previously used antenna combinations.

For other cases, antenna performance may be determined based on the statistical information, and the antenna combination to be used in the next transmission interval may be determined based on the antenna performance.

Figure 9:
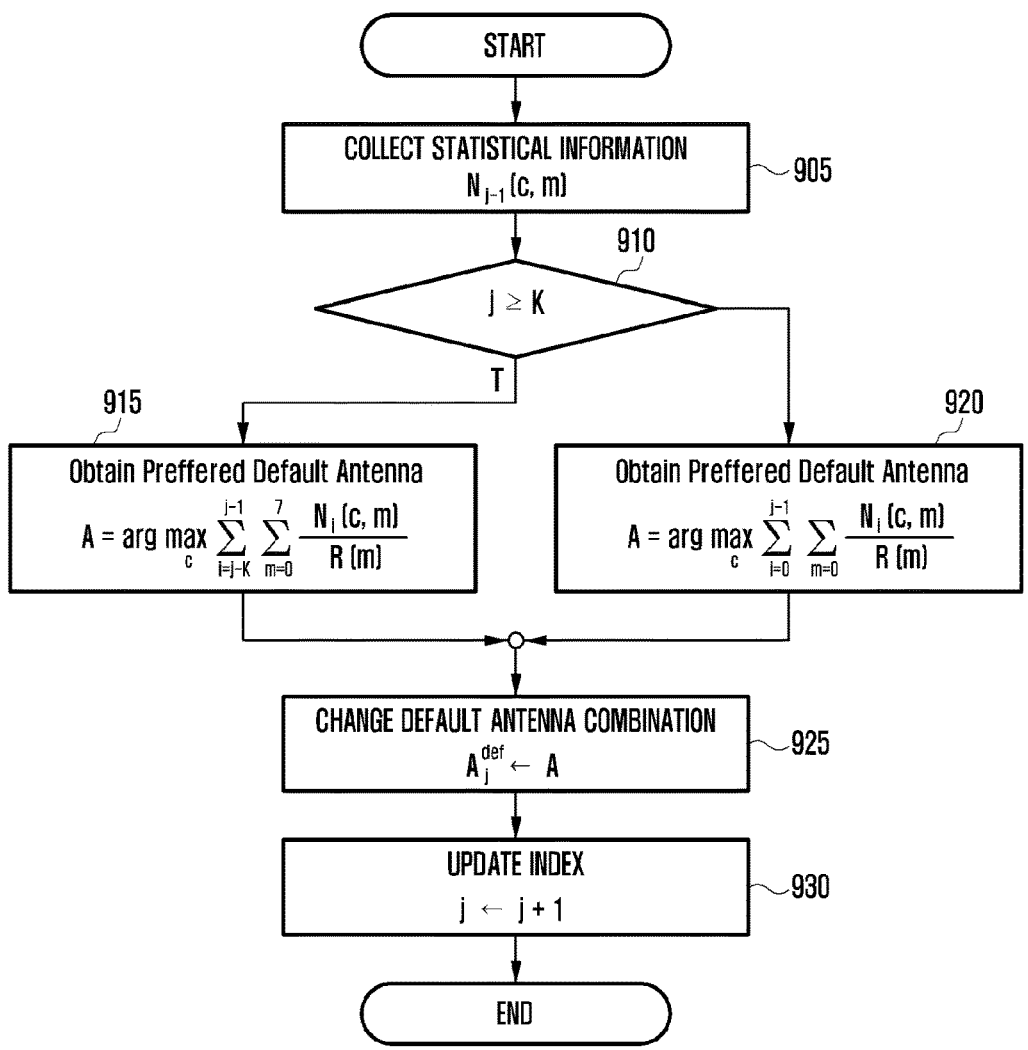
FIG. 9 is a diagram illustrating a method of selecting a default antenna combination according to one embodiment of the present disclosure.

FIG. 9 is a diagram illustrating a method of selecting a default antenna combination according to one embodiment of the present disclosure.

In the embodiment of the present disclosure, the AP basically selects the default antenna combination based on statistical information of antenna combinations selected by the transmission antenna combination selection.

The default antenna combination selection for packet reception and multicast transmission utilizes the statistical information on the downlink, instead of directly utilizing statistics on the uplink, so as to select the antenna combination showing the best performance on average for all terminals. In Act 905, the AP collects statistical information. A statistics collector may collect statistical information on how many packets are transmitted on the downlink using how antenna combination and modulation and coding scheme (MCS) during each interval (for example, 100 ms). The number of packets transmitted in an arbitrary i-th interval is denoted Ni(c,m) using the antenna combination c and the MCS m.

In Act 910, the current time index j and the K value are compared and according to the comparison result the process proceeds to Act 915 or Act 920. In Act 915 or Act 920, the AP selects the antenna combination that has successfully transmitted the largest number of packets for the transmission rate R(m) in previous K intervals, that is, the antenna combination satisfying the following expression as the default antenna combination.

$$A = \underset{c}{\operatorname{argmax}} \sum_{i=j-K}^{j-1} \sum_{m} \frac{N_i(c, m)}{R(m)}$$

Here, R(m) is the transmission rate of the MCS m, which includes a consideration of terminals of week electric field by having a high weight as a specific antenna combination uses an MCS of low transmission rate.

In Act 925, the default antenna combination to be used in the next interval is set. If the selected default antenna combination is different from the previously set default antenna combination, the default antenna combination may be changed.

In Act 930, the time index may be updated. The above acts may be repeated for each predetermined interval to set a default antenna.

Figure 10:
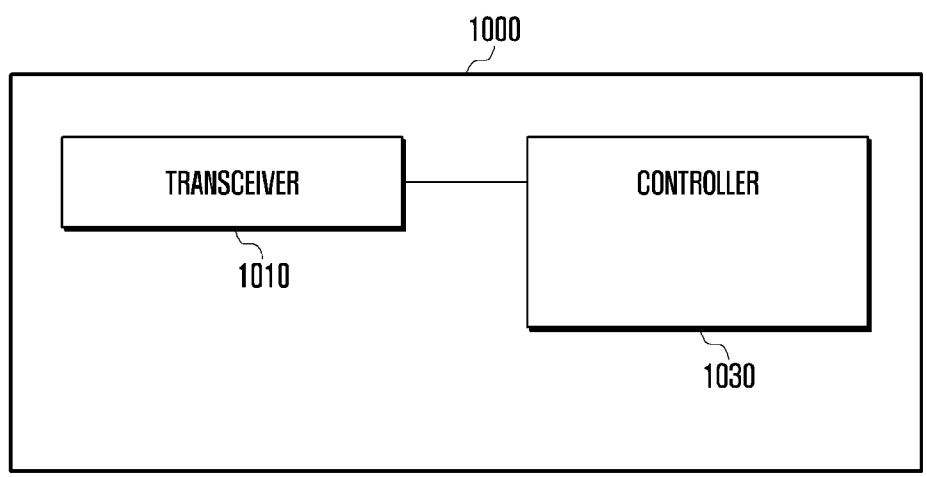
FIG. 10 a diagram illustrating a terminal according to one embodiment of the present disclosure.

FIG. 10 is a diagram illustrating a terminal according to one embodiment of the present disclosure.

Referring to FIG. 10, a terminal 1000 may include a transceiver 1010 and a controller 1030. The transceiver 1010 may transmit and receive a signal. The controller 1030 may control the overall operation of the terminal 1010. The controller 1030 may control the terminal 1010 to communicate with the AP described in the above embodiments.

In the embodiment of the present disclosure, according to the method describe above, based on statistical information, the transmission antenna combination for unicast transmission is selected and the default antenna combination for reception and multicast transmission is selected. In this way, it is possible to provide the method and the apparatus capable of reducing errors in packet transmission and improving communication performance.

The embodiments disclosed in the specification and drawings are merely illustrative of specific examples for easy explaining and better understanding of the present disclosure and not intended to limit the scope of the present disclosure. Therefore, the scope of the present disclosure is to be interpreted to include all changes and modifications derived from the technical idea of the present disclosure and falling within the scope of the present disclosure in addition to the embodiments described herein.

The invention claimed is:

1. An access point (AP) using multiple antennas, comprising:
a transceiver configured to transmit and receive a signal; and
at least one processor configured to:
set a first transmission descriptor including first antenna combination information and first transmission rate information and a second transmission descriptor including second antenna combination information and the first transmission rate information,
transmit a first packet based on the first transmission descriptor and transmit a second packet based on the second transmission descriptor,
receive information indicating whether a transmission of the first packet or a transmission of the second packet is a success, and
reset at least one of the first transmission descriptor and the second transmission descriptor based on the information.

2. The AP of claim 1, wherein each of the first antenna combination information and the second antenna combination information indicates a mapping relationship between at least one of antenna ports and at least one antennas corresponding to the at least one antenna port.

3. The AP of claim 1, wherein the at least one processor is configured to determine antenna combination information to be used in the resetting based on the information indicating whether the transmitted packet is a success or not.

4. The AP of claim 1, wherein the first transmission descriptor inlcudes first unit information including the first transmission rate and the first antenna combination, second unit information including second transmission rate and the second antenna combination, and third unit information including third transmission rate and third antenna combination, and
the second transmission descriptor includes fourth unit information including the first transmission rate and the second antenna combination, fifth unit information including the second transmission rate and the third antenna combination, and sixth unit information including the third transmission rate and the first antenna combination.

5. The AP of claim 4, wherein the at least one processor is configured to evaluate performance of each of the antenna combinations based on information indicating whether a packet transmitted by the antenna combination of each unit information in which the same transmission rate is set is successfully received.

6. The AP of claim 4, wherein the at least one processor is configured to determine antenna combination information to be used in the resetting based on performance evaluation of each of the antenna combinations.

7. The AP of claim 6, wherein the at least one processor is configured to, based on performance evaluation of each of the antenna combinations, determine antenna combinations that are evaluated as top two and a new antenna combination other than the first, second and third antenna combinations to be the antenna combination to be used in the ressetting.

8. The AP of claim 4, wherein in the setting of each of the first and second transmission descriptors, the antenna combinations are arranged in an order of the first antenna combination, the second antenna combination, and the third antenna combination in performance.

9. The AP of claim 1, wherein the at least one processor is configured to transmit a packet by alternately applying the first transmission descriptor and the second transmission descriptor.

10. The AP of claim 1, wherein the at least one processor is configured to set the antenna combination that has successfully transmitted the largest number of packets for a transmission rate to be a multicast transmission basic antenna combination.

11. The AP of claim 1, wherein the at least one processor is further configured to select new unit information for reset the at least one of the first descriptor and the second transmission descriptor,
wherein each transmission descriptor includes at least two unit information,
wherein one of an antenna combination and a transmission rate is different per unit information.

12. A method of an access point (AP) using multiple antennas, comprising:
setting a first transmission descriptor including first antenna combination information and a first transmission rate information and a second transmission descriptor including a second antenna combination information and the first transmission rate information;
transmitting a first packet based on the first transmission descriptor and transmitting a second packet based on the second transmission descriptors;
receiving information indicating whether a transmission of the first packet or a transmission of the second packet is a success; and
resetting at least one of the first transmission descriptor and the second transmission descriptor based on the information.

13. The method of claim 12, wherein each of the first antenna combination information and the second antenna combination information indicates a mapping relationship between at least one of antenna ports and at least one of antennas corresponding to the at least one antenna port.

14. The method of claim 12, further comprising:
determining antenna combination information to be used in the resetting based on the information indicating whether the transmitted packet is a success or not.

15. The method of claim 12, wherein the first transmission descriptor inlcudes first unit information including the first transmission rate and the first antenna combination, second unit information including second transmission rate and the second antenna combination, and third unit information in including third transmission rate and third antenna combination, and
the second transmission descriptor includes fourth unit information including the first transmission rate and the second antenna combination, fifth unit information including the second transmission rate and the third antenna combination, and sixth unit information including the third transmission rate and the first antenna combination.

16. The method of claim 12, wherein the transmitting of a packet includes transmitting a packet by alternately applying the first transmission descriptor and the second transmission descriptor.

17. The method of claim 12, further comprising:
selecting new unit information for reset the at least one of the first descriptor and the second transmission descriptor,
wherein each transmission descriptor includes at least two unit information,
wherein one of an antenna combination and a transmission rate is different per unit information.

* * * * *